United States Patent [19]

Chapotot et al.

[11] Patent Number: 5,519,397
[45] Date of Patent: May 21, 1996

[54] CIRCUIT FOR PROCESSING THE OUTPUT SIGNAL FROM A RESISTIVE ANALOG SENSOR, IN PARTICULAR FOR THE FUEL GAUGE OF A MOTOR VEHICLE, AND SYSTEMS FITTED THEREWITH

[76] Inventors: Michel Chapotot, 26 rue Eugènie, 95150 Taverny; Bernard Marteau, 18 allè de Montrèal, 91430 Igny, both of France; Vanni Poletto, Via Candiani d'Olivola 7/A, 15033 Casale Monferrato, AL; Alberto Poma, Via Angelini 64/B, 27100 Pavia, PV, both of Italy; Xavier Philippon, 5 place des Dryades, 78180 Montigny Le Bretonneux, France

[21] Appl. No.: 201,228

[22] Filed: Feb. 24, 1994

[30] Foreign Application Priority Data

Feb. 26, 1993 [FR] France .................................. 93 02217

[51] Int. Cl.$^6$ ................................................. H03M 1/12
[52] U.S. Cl. ......................................... 341/155; 340/450.2
[58] Field of Search ................................. 341/153, 154, 341/155, 163, 164; 340/450.2

[56] References Cited

U.S. PATENT DOCUMENTS

| | | | |
|---|---|---|---|
| 4,620,179 | 10/1986 | Cooper et al. | 341/163 |
| 4,866,435 | 9/1989 | Frick | 340/870.16 |
| 4,907,002 | 3/1990 | Kawada | 341/172 |
| 4,994,806 | 2/1991 | Yun-Tae | 341/155 |
| 5,059,981 | 10/1991 | Hauser | 341/164 |
| 5,382,956 | 1/1995 | Baumgartner et al. | 341/155 |
| 5,394,344 | 2/1995 | Lippmann et al. | 364/571.02 |

FOREIGN PATENT DOCUMENTS

| | | |
|---|---|---|
| 2561379 | 9/1985 | France . |
| 2592479 | 7/1987 | France . |
| 2595818 | 9/1987 | France . |

*Primary Examiner*—Marc S. Hoff
*Attorney, Agent, or Firm*—Jacobson, Price, Holman & Stern

[57] ABSTRACT

The present invention relates to a circuit for processing the output signal from a resistive analog sensor, comprising firstly a digital filter, and secondly a module forming a digital-to-impedance converter, which filter and module are interposed in series between the output of the sensor and the input of an associated load, the digital-to-impedance converter presenting an output impedance that is variable as a function of the output signal from the digital filter, which is equivalent to the output resistance of the sensor.

60 Claims, 12 Drawing Sheets

CIRCUIT FOR PROCESSING THE OUTPUT SIGNAL FROM A RESISTIVE ANALOG SENSOR, IN PARTICULAR FOR THE FUEL GAUGE OF A MOTOR VEHICLE, AND SYSTEMS FITTED THEREWITH

FIELD OF THE INVENTION

The present invention relates to systems including a resistive analog sensor whose output signal is applied to an electrically-controlled load, e.g. an indicator device or gauge.

The present invention is particularly, but not exclusively, applicable to gauges for motor vehicles.

BACKGROUND OF THE INVENTION

More precisely, the present invention relates most particularly, but not exclusively, to measurement systems of the type shown in FIG. 1 comprising both a resistive sensor Ca whose output resistance is a function of a detected physical magnitude, and an associated gauge Log, e.g. of the ratio meter type, connected to the output of the sensor Ca.

The resistive type sensor Ca, e.g. of the rheostat type, may have an output resistance that depends, for example, on the level of a liquid, such as the level of a fuel.

In known manner, ratio type gauges Log generally comprise at least two geometrically crossed coils B1 and B2. The coils B1 and B2 are connected electrically in series, generally between a ground terminal and a positive power supply terminal +Bat. The common point between the two coils B1 and B2 is connected to the output of the sensor Ca.

A bipolar permanent magnet secured to a pointer is mounted to rotate in the field of the two coils B1 and B2. Thus, the magnet and the pointer of the meter move as a function of the ratio between the currents flowing in the two coils B1 and B2, tending to come into alignment with the direction of the magnetic field that results from combining the fields in the two coils B1 and B2.

Numerous gauges have already been made that satisfy the above definition.

In particular, numerous gauges for the level of a liquid, in particular a fuel, have been made that satisfy the above definition. In the context of this particular application to measuring a liquid level, the sensor Ca is generally constituted by a resistive track over which there moves a wiper that is actuated by a float which tracks variations in the level of the liquid.

The person skilled in the art knows that the level of fuel in a motor vehicle tank is highly sensitive to accelerations and decelerations of the vehicle.

Consequently, various means have already been devised for avoiding that such untimely fluctuations in the measured liquid level give rise to oscillations in the reading given by the gauge.

As described in document FR-A-2 561 379, proposals have been made, for example, for devices that apply mechanical damping to the float sensor Ca. More precisely, according to that document, proposals have been made to mount the float that controls the sensor Ca at a first end of a lever and to constrain the second end of the lever to rotate with an inlet gear that drives a multiplicative gear train constituting the shock absorber device.

As described in document FR-A-2 592 479, for example, proposals have also been made to apply electrical damping to the signal output by the sensor Ca. As shown diagrammatically in FIG. 2, devices applying the teaching of that document include, inter alia, an analog lowpass filter PB interposed between the output from the sensor Ca and the input to the ratio meter Log, i.e. the common point between the two coils B1 and B2. More precisely, such a lowpass filter PB comprises a series resistor R1 and a parallel capacitor C1 connected to ground.

Still more precisely, as shown diagrammatically in FIG. 2, the electrical damping circuits Cae interposed between a sensor Ca and a ratio meter Log generally include a driver circuit referenced "PWM" (for Pulse Width Modulator) in FIG. 2 which applies a periodic squarewave electrical signal to the input of the ratio meter Log, with the duty ratio thereof depending on the amplitude of the signal delivered by the lowpass filter PB.

A very large number of gauges applying the teaching of said document FR-A 2 592 479 and shown diagrammatically in accompanying FIG. 2 have already been sold.

However, those devices still do not give complete satisfaction.

In particular, the Applicant has observed that the capacitors C1 of the analog lowpass filters PB give rise to non-negligible leakage that have the effect in practice of reducing the value and the stability of the time constant that can be achieved.

Furthermore, placing such a damping filter Cae, PB between the sensor Ca and the gauge Log has required gauges Log to be implemented having special characteristics such that said gauges are no longer suitable for use directly with a conventional sensor Ca, i.e. without a filter Cae, PB. It will be understood that the use of such special means gives rise to inevitable problems of supply and part number identification.

OBJECT AND SUMMARY OF THE INVENTION

The present invention now has the object of improving the state of the art by proposing novel means for filtering the signal output by a resistive sensor Ca, and suitable for use in conjunction with a conventional resistive sensor Ca and a conventional load Log.

In the context of the present invention, this object is achieved by means of a circuit comprising firstly digital filter means, and secondly a module forming a digital-to-impedance converter, which means and module are interposed in series between the output of the sensor and the input of an associated load, said digital-to-impedance converter presenting an output impedance that is variable as a function of the output signal from the digital filter means, which output impedance is equivalent to the output resistance of the sensor.

Advantageously, according to another characteristic of the present invention, the digital-to-impedance converter comprises means for measuring the voltage at the terminals of the load and an output stage of the controlled current source type for delivering a current that is proportional to the ratio between the voltage measured at the terminals elf the load and the output resistance of the sensor.

In a preferred embodiment of the invention, the module forming the digital-to-impedance converter is constituted by a resistor array and by an impedance converter.

According to an advantageous characteristic of the present invention, the impedance converter comprises a shunt resistor connected in series with the output of the resistor array, a first voltage-copying stage suitable for copying the voltage that is present at the input of the load onto the output terminals of the resistor array, a current generator connected in series with a resistor forming a unit connected to the input terminals of the load, and a second voltage-copying stage suitable for copying the voltage present at the terminals of the shunt resistor onto the resistor that is connected in series with the current source.

In a preferred embodiment, the digital filter means comprise a comparator stage having a first input receiving the output signal from the sensor, an up/down counter having an input that receives a clock signal at a constant frequency, and having an up/down control input that receives the output from the comparator stage, and a resistor array connected between the output of the up/down counter and a second input of the comparator stage.

According to another advantageous characteristic of the present invention, the digital filter means comprise:

detection means suitable for detecting crossovers between the input signal and a filtered value of said input signal;

timing means restarted on each crossover detected by the detection means; and inhibit means for inhibiting the filter if no crossover is detected by the detection means before the timing means have timed out, and for enabling the filter on the first crossover that is detected by the detection means after the filter has been inhibited.

According to anther advantageous characteristic of the invention, the inhibit means comprise means suitable for changing the time constant of the filter.

The present invention also relates to systems fitted with the above-specified circuit.

BRIEF DESCRIPTION OF THE DRAWINGS

Other characteristics, objects, and advantages of the present invention appear on reading the following detailed description of non-limiting examples of the invention made with reference to the accompanying drawings, in which.

MORE DETAILED DESCRIPTION

As mentioned above, the gauge circuit of the present invention essentially comprises digital filter means 100 and a module 200 constituting a digital-to-impedance converter, which means and module are interposed in series between the output from a sensor Ca and the input of a load, e.g. a ratio meter Log.

To simplify the description, in the embodiments described below, the load is constituted by a ratio meter. However, the present invention is not limited to use with a ratio meter. In particular, it extends to use with any kind of analog gauge of the electromagnetic type, and in particular of the magneto-electrical type, and in general to any electrically controlled load suitable for being controlled by a resistive sensor.

The structure of said means 100 and 200 in a preferred embodiment of the present invention is described below with reference to FIGS. 4 et seq.

Figure 4:
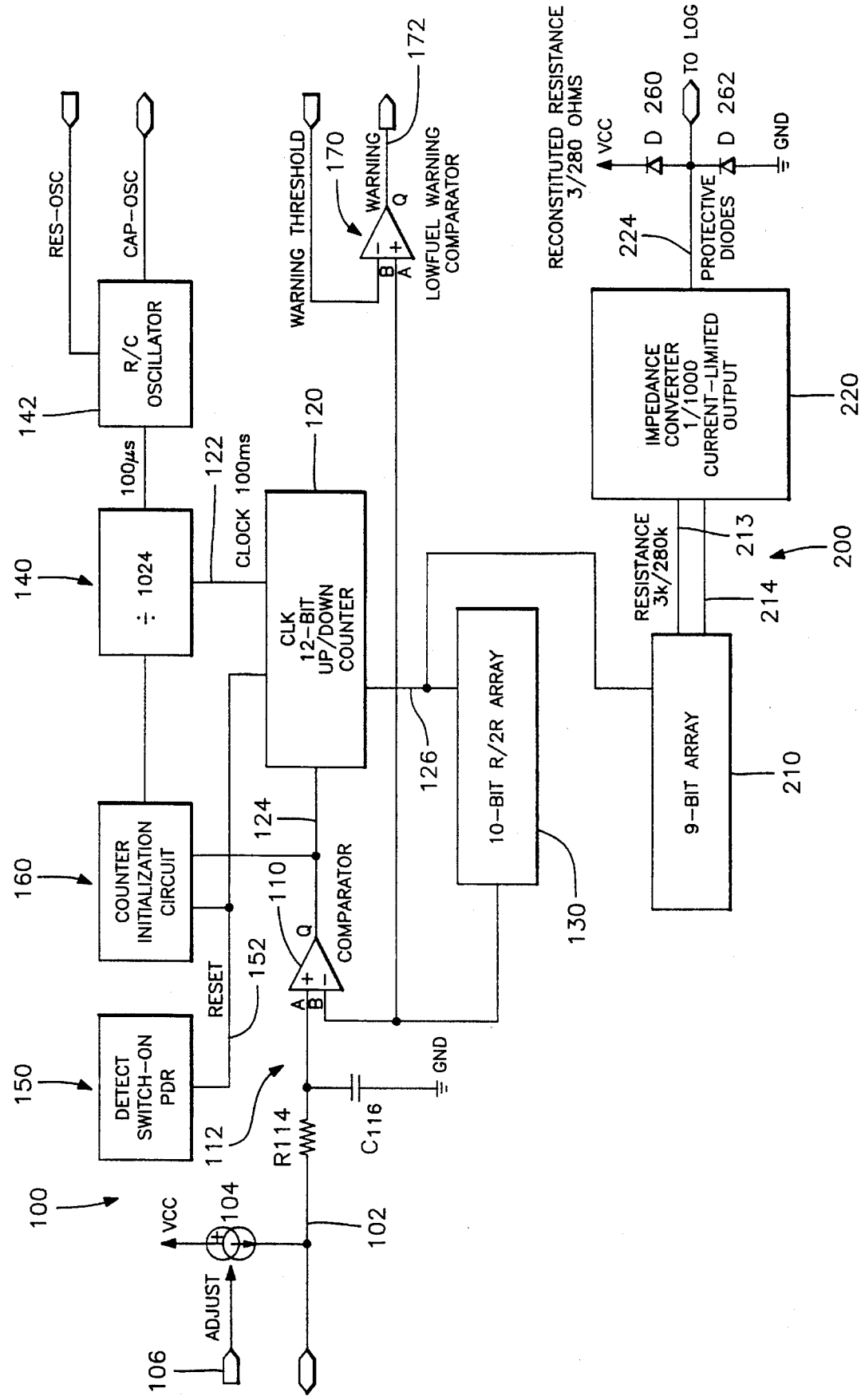
FIG. 4 is a more detailed block diagram of a circuit of the present invention.

In FIG. 4, the input of the digital filter means 100 connected to the output of the sensor Ca is referenced 102.

As shown diagrammatically in FIG. 4, the sensor Ca is preferably powered by a constant current source 104. This source is preferably itself adjustable by means of an input 106.

As mentioned above, the digital filter means 100 shown in FIG. 4 essentially comprise a comparator 110, an up/down counter 120, and an array of resistors 130.

The comparator 110 receives the output signal from the sensor Ca on a first one of its inputs, referenced A in FIG. 4, which signal is available on the input 102. More precisely, a lowpass filter 112 is preferably interposed between said input 102 and the input A of the comparator 110. The lowpass filter 112 comprises a resistor R114 connected in series between the input 102 of the circuit and the input A of the comparator 110, together with a capacitor C116 connecting the output of the filter 112, i.e. the input A of the comparator 110, to ground.

The output of the comparator 110 switches between two states depending on whether or not the signal it receives on its input A is greater than the signal applied to its second input B.

On its input 122, the up/down counter 120 receives a clock signal at a constant frequency, e.g. one pulse per 100 ms. The up/down control input 124 of the up/down counter 120 is connected to the Q output of the comparator 110.

Thus, depending on the state of the output of the comparator 110, the up/down counter 120 counts alternately up and down at the rate of the clock signal applied to its input 122.

The outputs 126 of the up/down counter 120 are applied to the inputs of an array of resistors 130. The output from the array is connected to the second input B of the comparator 110.

The person skilled in the art will readily understand that the digital signal formed by the outputs 126 of the up/down counter 120 is representative of the level of the output from the sensor Ca (input 102), and consequently of the amplitude of the measured physical magnitude, e.g. the level of fuel in a motor vehicle tank.

Yet more precisely, in order to avoid a continuously changing reference signal being applied by the array 130 to the input B of the comparator 110, it is preferable for the array of resistors 130 to make no use of the least significant bits output by the up/down counter 120.

Thus, for example, if the up/down counter 120 has a capacity of twelve bits, then the array of resistors 130 need make use only of the ten most significant bits output by the up/down counter 120.

The person skilled in the art will readily understand that by making use of the more significant bits only of the up/down counter 120 and by clocking the up/down counter by means of a clock signal applied to its input 122, the signal applied at the input 102 is subjected to digital filtering.

Figure 1:
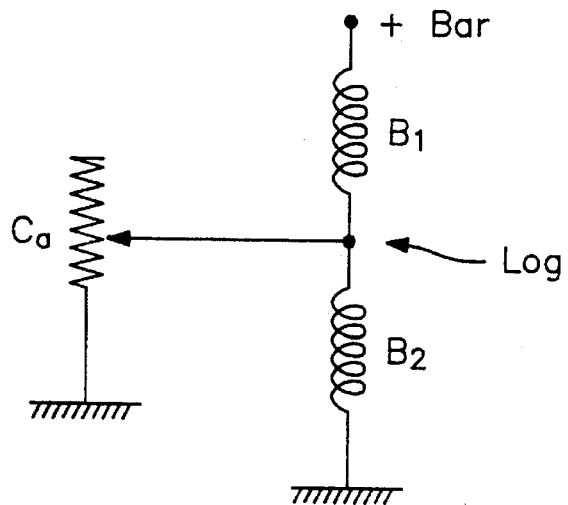
FIGS. 1 and 2 as described above show prior art circuits.
Figure 2:
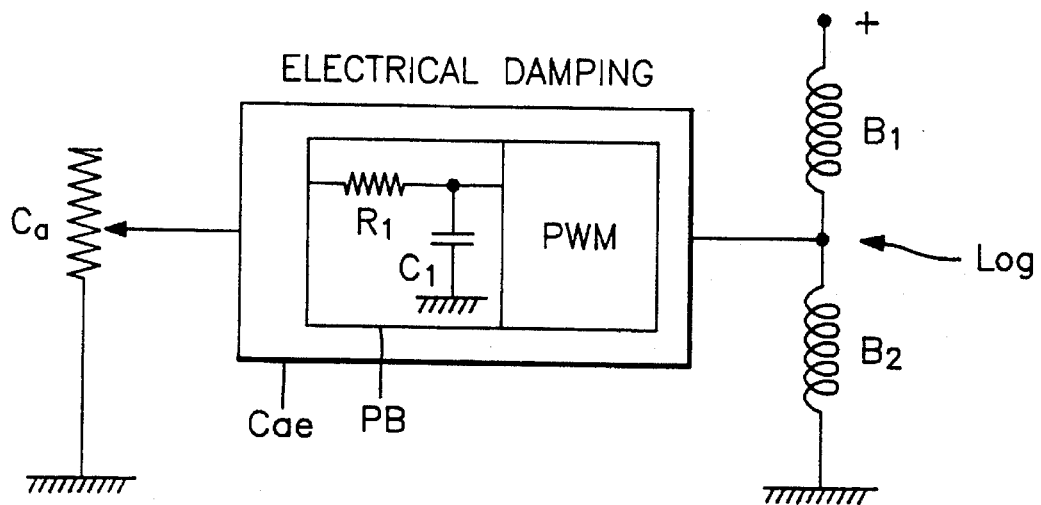
Figure 3:
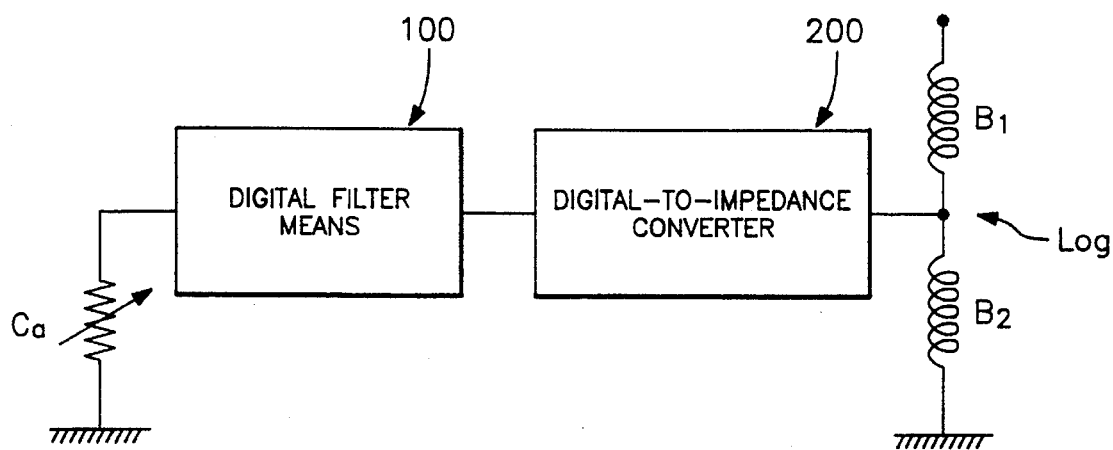
FIG. 3 is a block diagram of a gauge circuit of the present invention.
Figure 7:
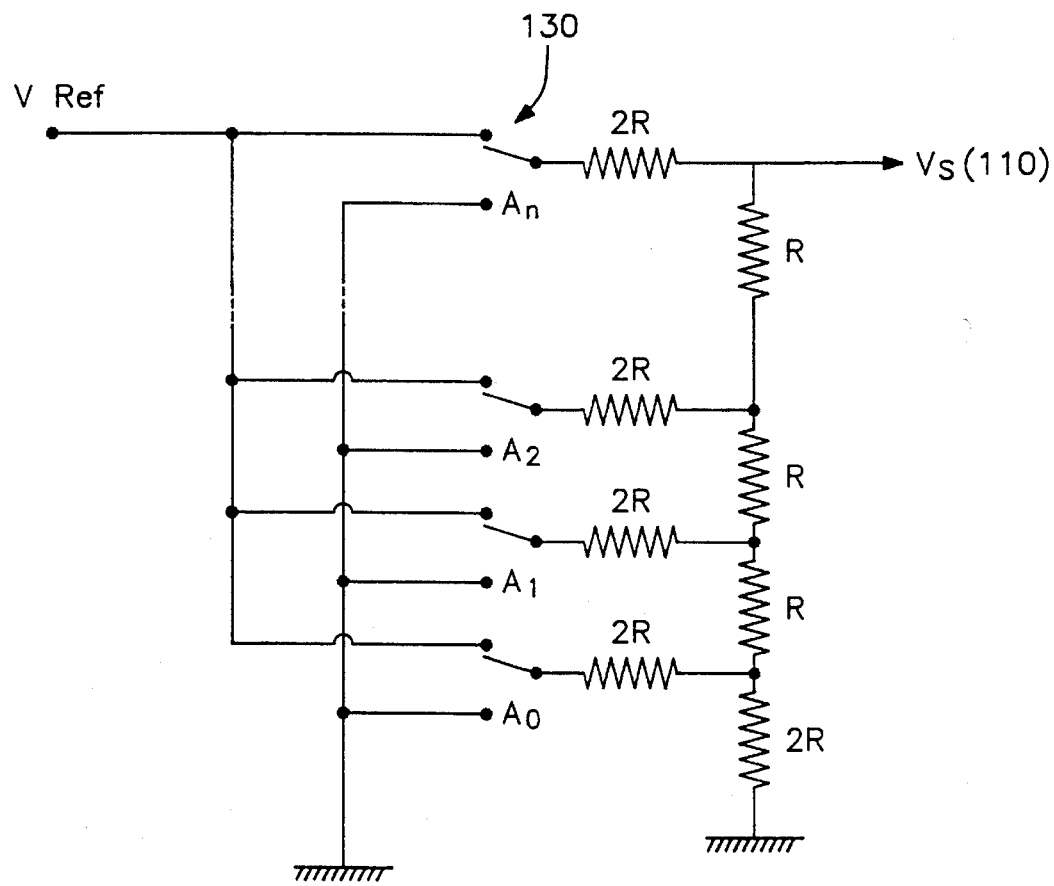
FIG. 7 shows an array of R/2R resistors used in the context of the present invention.

In a preferred embodiment, the resistor array 130 is constituted by a so-called R/2R array of the type shown in FIG. 7.

Such an array 130 of resistors comprises firstly a divider bridge comprising a plurality of resistors of resistance R connected in series via a resistor of resistance 2R between ground and the output of the array. The resistor of resistance 2R is located at the ground end of the divider bridge. The number of resistors of resistance R or 2R in the divider bridge is equal to the number of bits used from the up/down counter 120. Each point common to two adjacent resistors in the divider bridge, and also the output point thereof is additionally connected via a respective resistor of resistance 2R to a respective switch A0, A1, A2, ..., An. Each switch A0 to An is controlled by a respective associated one of the outputs from the up/down counter 120. More precisely, the switch An closest to the output from the array 130 is controlled by the most significant bit, while the switch A0 closest to ground is controlled by the least significant bit in use.

Thus, depending on the state of the associated output of the up/down counter 120, each switch A0 to An connects the corresponding resistor of resistance 2R either to ground or else to a reference voltage VRef.

The output of the array 130 as applied to the input B of the comparator 110 delivers a signal:

$$Vs = VRef[An/2 + \ldots + A3/2^{n-2} + A2/2^{n-1} + A1/2^n + A0/2^{n+1}]$$

Figure 8:
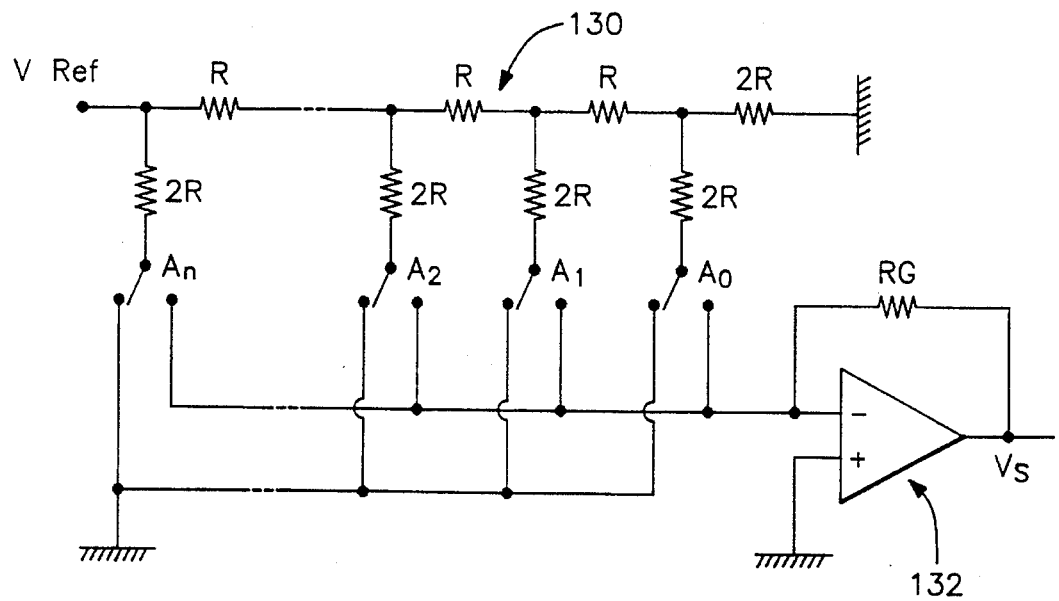
FIG. 8 shows a variant implementation of an array of R/2R resistors used in the context of the present invention.

In the variant array shown in FIG. 8, there can be seen a divider bridge comprising a plurality of resistors of resistance R connected in series via a resistor of resistance 2R between ground and a reference value VRef. The resistor of resistance 2R is at the ground end of the divider bridge. The number of resistors of resistance R or 2R in the divider bridge is equal to the number of bits that are used from the up/down counter 120. Each point common to two adjacent resistors in said divider bridge, and also its end that receives the reference voltage VRef is also connected via a respective resistor of resistance 2R to a respective switch A0, A1, A2, ..., An. Each switch A0 to An is controlled by a respective associated output of the up/down counter 120. More precisely, the switch An closest to the reference voltage VRef is controlled by the most significant bit, whereas the switch A0 closest to ground is controlled by the least significant bit in use. Depending on the associated output state of the up/down counter 120, each switch A0 to An connects the corresponding resistor of resistance 2R either to ground or to the inverting input of an operational amplifier 132. The non-inverting input thereof is connected to ground, while the output of the amplifier is fed back to its inverting input via a resistor of resistance RG. The output of the array 130 shown in FIG. 8 is made available at the output of the operational amplifier 132.

This output provides the following signal:

$$Vs = RG \cdot VRef[An + \ldots + A2/2^{n-2} + A1/2^{n-1} + A0/2^n]2R$$

The clock signal applied to the input 122 of the up/down counter 120 is preferably taken from a divider 140 connected to an oscillator 142. By way of example, the oscillator 142 may deliver a signal having a constant period of 100 µs, with the divider 140 performing division by 1024.

To enable the gauge Log to reach its operating point quickly in spite of the presence of digital filtering, provision is made for means that are suitable for changing the frequency of the clock signal as applied to the up/down counter 120 when the system is switched on. These means comprise a module 150 for detecting switch-on and an initialization circuit 160. When the module 150 detects switch-on, its output 152 is used both to reset the up/down counter 120 to zero and to enable the initialization circuit 160. The initialization circuit then acts on the divider 140 to short-circuit it, or at least to change the number by which it divides so as to increase the frequency of the clock signal applied to the input 122 of the up/down counter 120.

The output Q of the comparator 110 is preferably also connected to the initialization circuit 160. After the up/down counter 120 has been reset to zero due to switch-on being detected, the output thereof increases progressively up to the measured value, after which it tends to oscillate on either side thereof. After the output from the comparator 110 has passed X times through zero, the initialization circuit 160 is in a position to consider that steady conditions have been achieved and it can then cease inhibiting the divider 140.

Warning detection means are preferably provided that comprise a comparator 170 which receives the output signal from the array 130 (representative of the measured physical magnitude) on one of its inputs and which receives a warning threshold on a second input. The output 172 of the comparator 170 may be used to drive a warning lamp or indicator, for example.

As mentioned above, the function of the converter 200 is to present the gauge Log with an output impedance that varies as a function of the output signal from the digital filter means 100, which impedance is equivalent to the output resistance of the sensor Ca.

In the preferred embodiment shown in FIG. 4, the digital-to-impedance converter 200 comprises a resistor array 210 and an impedance converter 220.

Figure 9:
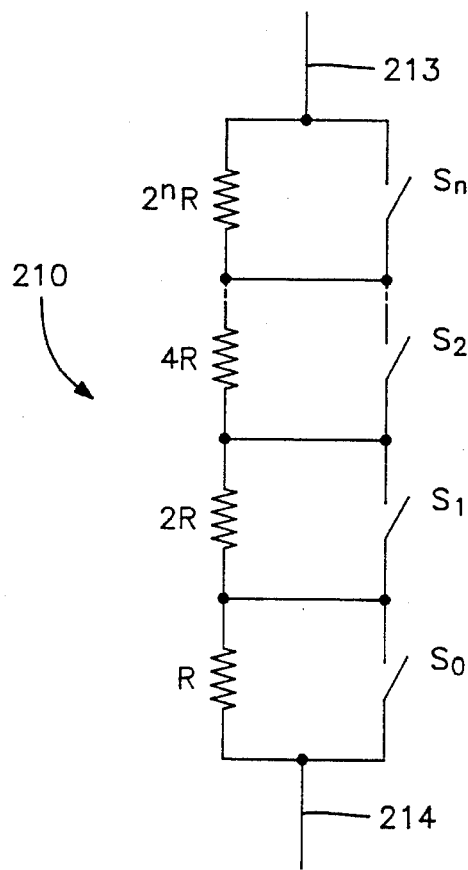
FIG. 9 shows another array of resistors suitable for use in the context of the present invention.

The array 210 is preferably an array of the type shown in FIG. 9.

The array 210 is controlled by the output 126 of the up/down counter.

The array 210 includes switches S0 to Sn connected in series between the two output terminals 213 and 214 of the array 210. Each switch S0 to Sn is connected in parallel with a resistor. More precisely, these resistors have increasing resistances of $R \times 2^n$, where n represents the order of the associated switch, i.e. the weight of the corresponding output bit of the up/down counter 120.

Here again, the switches S0 to Sn are controlled by the more significant bits of the up/down counter 120. The array 120 preferably makes use of one low-significance bit fewer than does the array 130. Thus, for an up/down counter 120 having a capacity of 12 bits, the array 210 preferably has nine switches S controlled by the more significant bits of the up/down counter 120.

Figure 5:
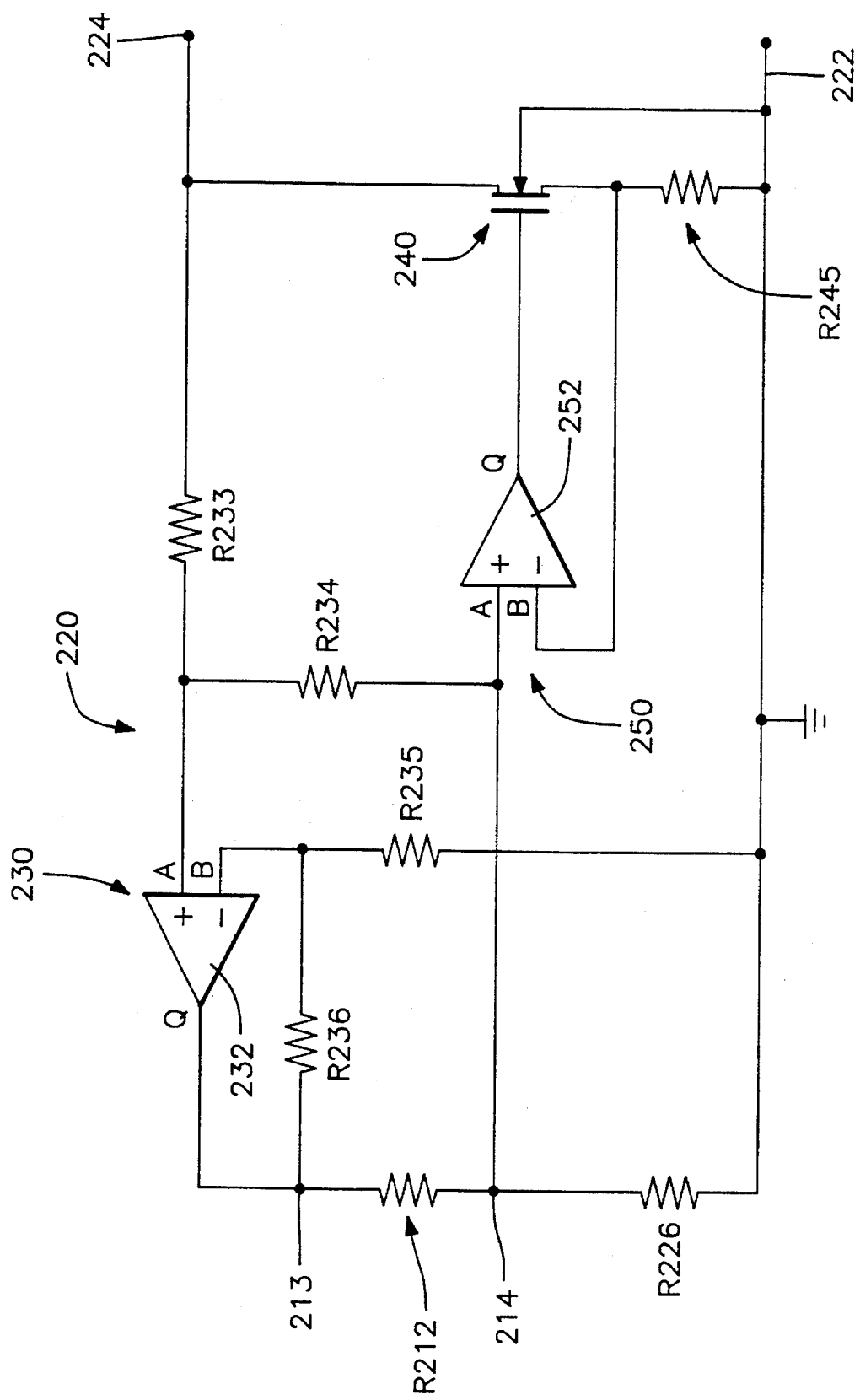
FIG. 5 is a schematic of a preferred embodiment of an impedance converter of the present invention.

The array 210 is connected to the input of the impedance converter 220 whose structure is shown in greater detail in FIG. 5.

In FIG. 5, reference R212 designates the resistance output by the array 210.

The inputs of the ratio meter Log need to be connected in series between a ground terminal 222 and an output 224 of the converter.

The impedance converter 220 essentially comprises a shunt resistor R226, a first voltage-copying stage 230, a current source 240, a resistor R245, and a second voltage-copying stage 250.

The resistor R226 is connected in series with the output R212 of the array 210.

The first voltage-copying stage 230 series to copy the voltage present between the outputs 222 and 224 of the impedance converter 220, (i.e. the voltage on the input of the gauge Log) onto the output R212 of the array 210.

To this end, the copying stage 230 comprises an operational amplifier 232 whose non-inverting input is connected firstly via a first resistor R233 to the output 224 and secondly via a second resistor R234 to the common point between the output of the array 210 and the shunt resistor R226.

The inverting output of the operational amplifier 232 is connected firstly via a resistor R235 to the ground line 222 and secondly via a resistor R236 to the output of the operational amplifier 232. The output of the operational amplifier 232 is also connected to the output of the array 210 that is remote from the shunt resistor R226.

To enable the voltage present between the outputs 222 and 224 on the output R212 of the array 210, all four resistors R233, R234, R235, and R236 have the same resistance.

Thus, a voltage is obtained on terminal 213 of the array 210 that is equal to the sum of the voltage at the terminals of resistor R226 plus the voltage at the input terminals of the gauge Log, i.e. the voltage at the input to the gauge appears at the terminals of the array 210.

The shunt resistor R226 carries the same current as the output of the array 210, as represented by resistor R212 in FIG. 5.

The current source 240 comprises a transistor, e.g. a MOS-FET. Its main conduction path is connected in series with the resistor R245 across the outputs 222 and 224. The resistor R245 has smaller resistance than the resistor R226. By way of non-limiting indication, the resistance of the resistor R245 may be one-thousandth the resistance of the resistor R226, for example the resistor R245 may have a resistance of 1 ohm while the resistor R226 has a resistance of 1 Kohm. The second voltage-copying stage 250 series to copy the voltage present across the terminals of the resistor R226 onto the terminals of the resistor R245.

To this end, the stage 250 is preferably constituted by an operational amplifier 252 connected as a comparator. Its non-inverting input is connected to the common point between the array 210 and the shunt resistor R226. The inverting input of the comparator 252 is connected to the common point between the transistor 240 and the resistor R245. Finally the output Q of the comparator 252 feeds the control electrode of the transistor 240.

The person skilled in the art will thus understand that the current flowing through the resistor R245 is proportional to the current flowing through the output of the array 210 with a weighting factor equal to the ratio of the resistances of R226 and R245. This current delivered by the transistor 240 is proportional to the ratio between the voltage across the terminal 222–224 of the load and the output resistance of the sensor.

Consequently, the output of the impedance converter 220 as taken between the terminals 222 and 224 and as seen by the gauge Log, behaves like a resistance that is proportional to R212/k where k is the weighting factor between the resistances of R226 and R245, i.e. R226=k×R245.

In other words, the converter 220 enables the output impedance of the array 210 to be converted into an impedance that is proportional, but much smaller.

Thus, the use of an impedance converter 220 in accordance with the present invention makes it possible to use an array 210 of resistors having high resistances, or in any event resistances that are much greater than the parasitic impedances of the control switches S0 to Sn, while still having a low impedance at the output from the converter 220, i.e. an impedance comparable to the output impedance of conventional sensors Ca, i.e. typically 0 to 280 ohms.

The person skilled in the art will understand that to obtain very low impedances for the purpose of controlling the ratio gauge Log without using an impedance converter 220, it would be necessary to make the array 210 out of resistors of resistances compared with which the parasitic resistances of the control resistors S0 to Sn would not be negligible. The use of an impedance converter 220 in accordance with the present invention consequently makes it possible to increase the reliability and the accuracy of the device quite considerably.

As shown diagrammatically in FIG. 4, the output 224 of the impedance converter 220 is preferably protected by means of two diodes D260 and D262 respectively connected as follows: for diode D260, cathode to +Vcc and anode to the output 224; and for diode D262, cathode to the output 224 and anode to ground.

Figure 6:
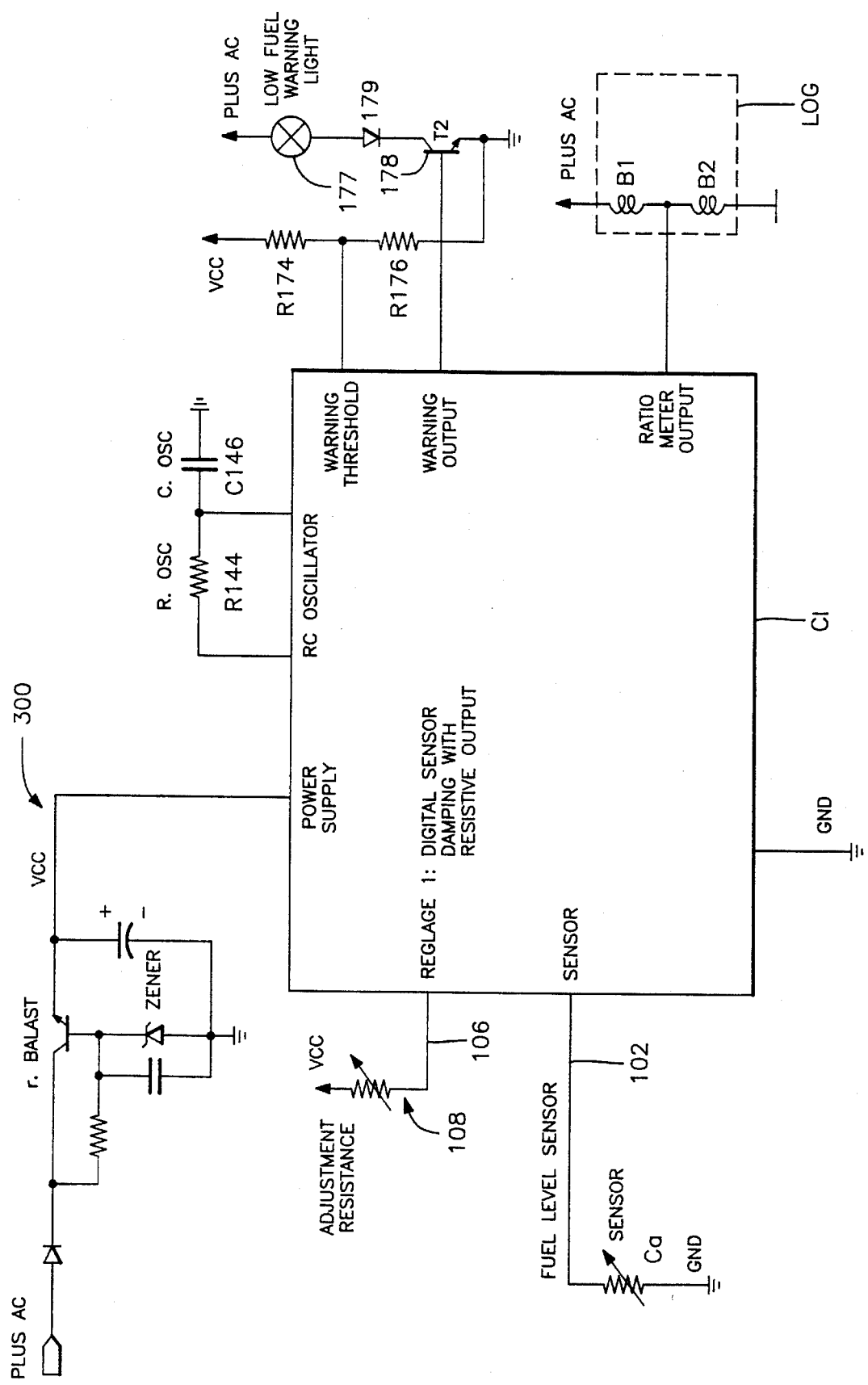
FIG. 6 is a block diagram of a preferred embodiment of the circuit of the present invention implemented as an integrated circuit.

As shown diagrammatically in FIG. 6, the entire circuit constituting the digital filter means 100 and the digital-to-impedance converter 200 shown in FIGS. 4 and 5 can be implemented in the form of an integrated circuit CI. This integrated circuit CI may be powered by a voltage regulator circuit 300 of conventional design. In FIG. 6, reference 108 designates a resistance for adjusting the current source 104 connected to the input 106 of the circuit.

The oscillator 142 may be integrated in the circuit CI and, as shown in FIG. 6, may include an external resistor R144 and an external capacitor C146.

Means for defining the warning threshold applied to the comparator 170 are represented in FIG. 6 in the form of a resistive divider bridge R174, R176. The divider bridge comprises two resistors R174 and R176 connected in series between a power supply terminal +Vcc and ground. The common point between the resistors R174 and R176 is fed to the inverting input of the comparator 170.

A warning lamp control module 177 is shown in FIG. 6. This module comprises a transistor 178 whose control input is connected to the output 172 and whose main conduction path is connected in series with the lamp 177 via a diode 179.

Finally, FIG. 6 shows the sensor Ca connected to the input 102 of the circuit, and the ratio meter Log that comprises two coils B1 and B2 whose common point is connected to the output of the impedance converter 220.

The circuit described above may be implemented in various different ways.

Thus, for example, instead of being defined by a divider bridge R174, R176, the warning threshold may be defined by a non-volatile memory. The same applies to the parameter for adjusting the current generator 104 (defined by the resistance 108 in FIG. 6) and the choice of time constant (defined by the components R144 and C146 in FIG. 6).

A variant embodiment of the module constituting the digital-to-impedance converter 200 is now described with reference to FIG. 10.

Here again, the ratio meter is to be connected between ground 222 and the input 224 of the converter 200. The module 200 in FIG. 10 continues to have a current source 240 connected in series between the terminals 224 and 222, and preferably constituted by a transistor such as a MOSFET, and a resistor R245.

The current source 240 is driven by a variable gain amplifier 270 in which the resistor array 272 has an effect, which array is itself under the control of the output of the digital filter means 100.

More precisely, the current source 250 is preferably driven by an amplifier and an attenuator formed by said resistor array.

Still more precisely, for the purpose of driving the current source 240, the following are provided in succession between the resistor R245 and the control grid of the current source 240: a first amplifier 271; a resistor attenuator 272 driven by the output of the digital filter means 100; and a second amplifier 273.

Figure 10:
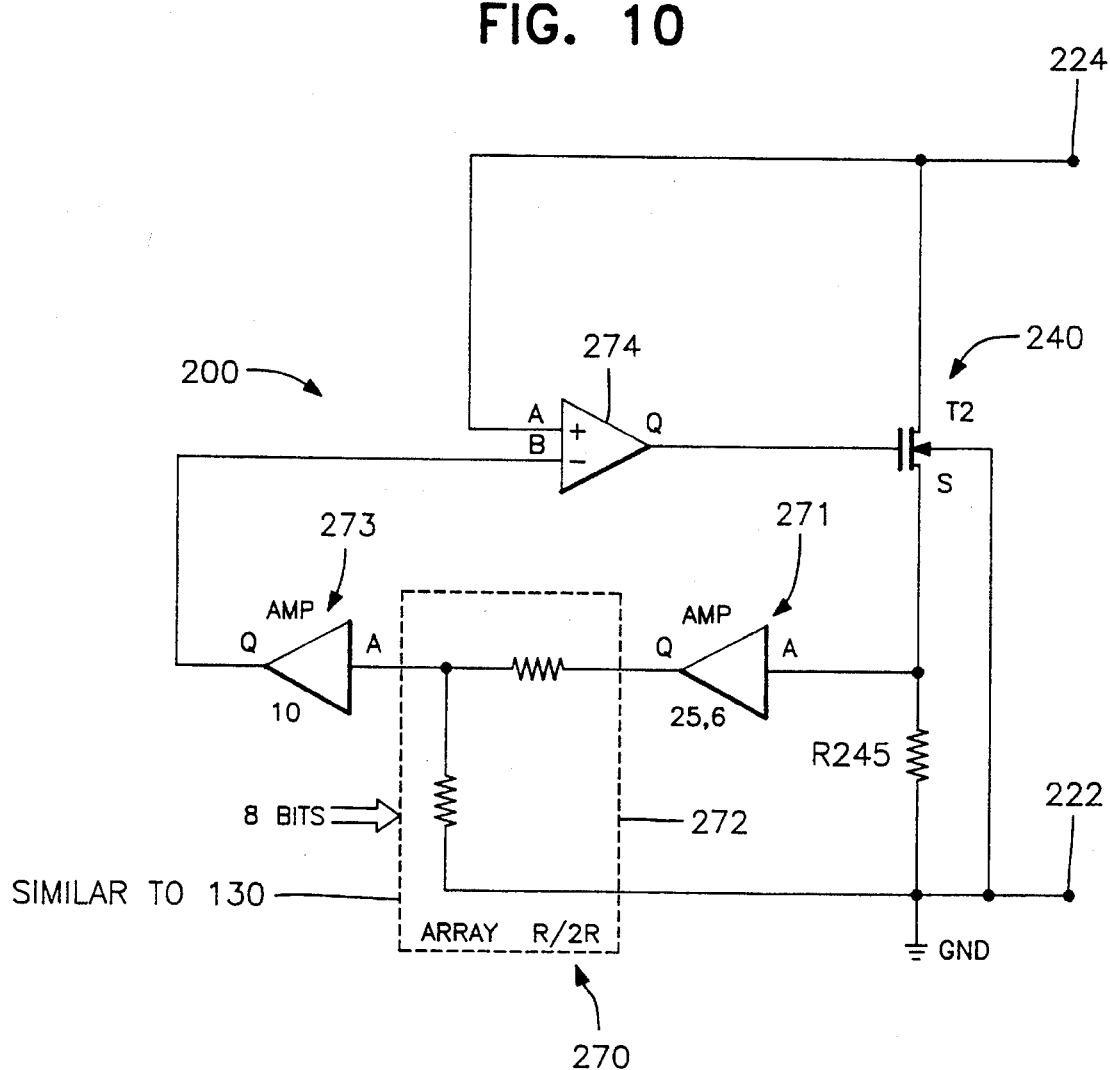
FIG. 10 shows a variant embodiment of an impedance converter in accordance with the present invention.

Thus, in accompanying FIG. 10 there can be seen a first amplifier 271, e.g. having gain equal to 25.6, with its input connected to the common point between the resistor R245 and the source 240.

The attenuator 272 is connected to the output of the amplifier 271. The attenuator 272 may be constituted by a resistor array as described above with reference to FIGS. 7 or 8, providing the output of the amplifier 271 is connected to the terminal receiving the voltage marked as the reference voltage in FIGS. 7 and 8.

The attenuator 272 feeds the input of amplifier 273. This amplifier typically has gain equal to 10.

The output of the amplifier 273 feeds the first input of a comparator 274. The second input of the comparator 274 receives the potential present on the output terminal 224.

Finally, the output of the amplifier 274 feeds the control grid of the current source 240.

Figure 11:
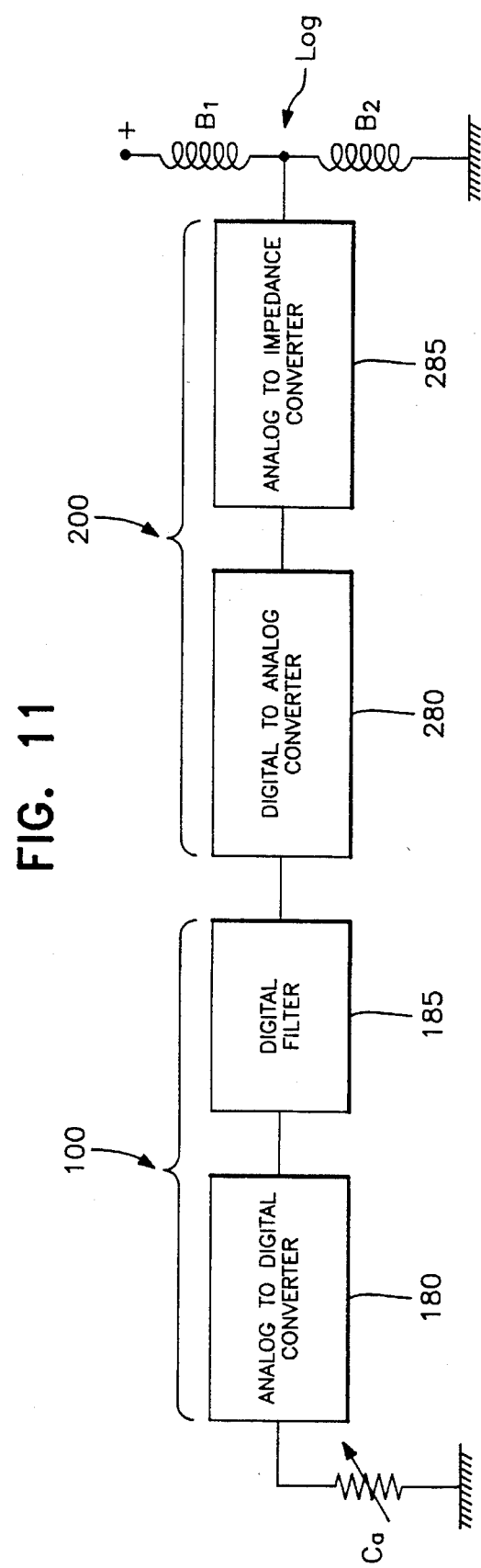
FIG. 11 is a block diagram of another variant embodiment of the gauge circuit of the present invention.

The variant embodiment shown in FIG. 11 is now described.

In this variant, the digital filter means 100 comprise a series connection of a analog-to-digital converter 180 and a digital filter 185.

In addition, in the variant shown in FIG. 11, the digital-to-impedance converter means 200 comprise a series connection of a digital-to-analog converter 280 and an analog to impedance converter 285.

Naturally, it is possible to envisage combining the variant embodiment shown in FIG. 11 with the preferred means described above with reference to FIGS. 4 to 10.

Thus, it is possible to combine digital filter means 100 comprising a series connection of an analog-to-digital converter 180 and a digital filter 185, as shown in FIG. 11 with a digital-to-impedance converter 200 as shown in FIGS. 4, 5, and 10. Similarly, it is possible to combine the digital filter means 100 of the type shown in FIG. 4 with the digital-to-impedance converter means comprising a series connection of a digital-to-analog converter 280 and an analog to impedance converter 285, as shown in FIG. 11.

Figure 12:
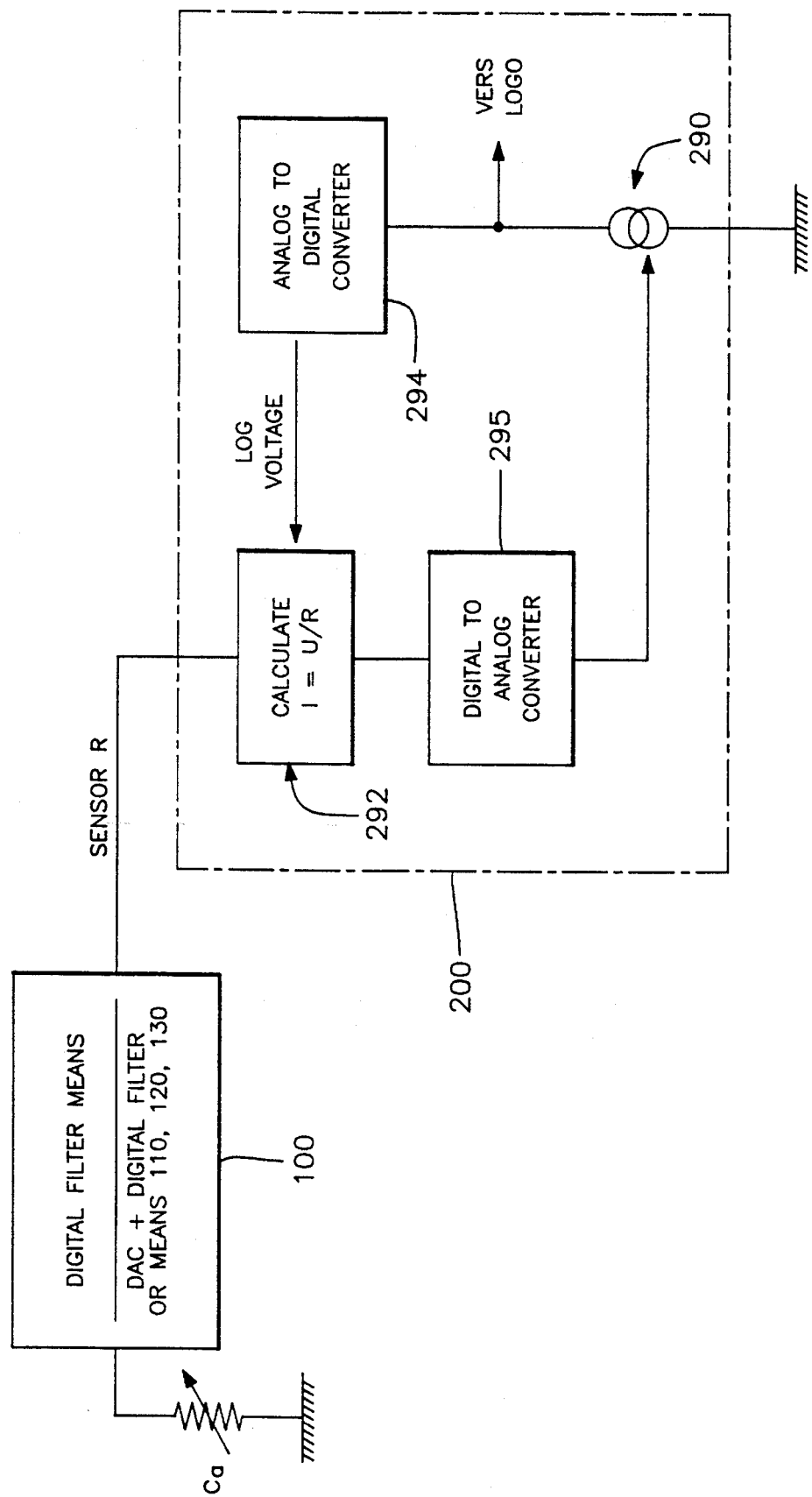
FIG. 12 is a block diagram of another variant embodiment of a digital-to-impedance converter of the present invention.

FIG. 12 shows a variant embodiment of a module forming a digital-to-impedance converter 200. As shown in FIG. 12, this variant of the module 200 may be used either in association with digital filter means 100 comprising a combination of an analog-to-digital converter and a digital filter as shown in FIG. 11, or else with digital filter means 100 as shown in FIG. 4, i.e. comprising in combination a comparator 110, an up/down counter 120, and a resistor array 130.

The module 200 essentially comprises a current source 290 connected to the input of the ratio meter and ground, and associated with control means 292 for controlling the current source 290 such that the current source delivers a current equal to the ratio between the input voltage to the ratio meter and the resistance of the input sensor Ca as filtered by the means 100.

Still more precisely, in the preferred embodiment shown in FIG. 12, the control means 292 are formed by digital calculation means that receive both digital data representative of the resistance of the sensor Ca as taken from the output of the digital filter means 100, and also digital data representative of the input voltage to the ratio meter as delivered by an analog-to-digital converter 294.

The output of the calculation means 292 controls the current source 290 via a digital-to-analog converter 295.

Naturally, in a variant, instead of using digital type calculation means 292, it is possible in a variant to use analog calculation means similarly adapted to cause the current source 290 to deliver current equal to the ratio between the input voltage applied to the ratio meter and the resistance of the sensor Ca as filtered by the means 100. Under such circumstances, the analog calculation means 292 could receive analog data representative of the resistance of the sensor from the output of a resistor array controlled by the filter means 100. The array could be the resistor array 130 shown in FIG. 4, for example. Under such circumstances, the resistor array 130 constitutes the digital-to-analog conversion means. Furthermore, the analog calculation means 292 may receive the data concerning the analog voltage present at the input terminals of the ratio meter directly. The analog-to-digital converter 294 and the digital-to-analog converter 295 are then omitted.

In practice, the integrated circuit CI integrates the digital filter means 100 and the digital-to-impedance converter 200 may be incorporated either in the sensor Ca or else in the ratio meter Log, or it may constitute an intermediate module that is independent.

It is important to observe that the present invention makes it possible to use a sensor Ca and a load Log that are both conventional standard components, e.g. a conventional liquid level pickup Ca and a conventional ratio meter Log. The present invention can thus be fully interchangeable. In other words, under steady conditions, the invention makes it possible to obtain an identical relationship between the resistance of the sensor and the reading displayed on the load or gauge, whether the filter circuit of the present invention is present or absent.

Naturally, the present invention is not limited to the particular embodiments described above, but extends to any variant coming within the spirit of the invention.

In the description above, the sensor is assumed to be of the rheostat type and to be fed by a current source 104. Under such circumstances, the measurement data is constituted by the voltage across the terminals of the variable resistor implemented in that way.

In a variant, it is possible to use a potentiometer type resistive sensor, in which case the sensor resistance is fed by a regulated voltage and the measurement data is obtained from the wiper of the potentiometer.

It should be observed that because of the structure of the circuit proposed in the context of the present invention, the current flowing through the pickup sensor Ca does not correspond to the current flowing through the ratio meter Log. Thus, while maintaining a high control current for the ratio meter, it is possible to envisage feeding the sensor Ca with a small current in order to minimize the effects of electrolysis.

Figure 13:
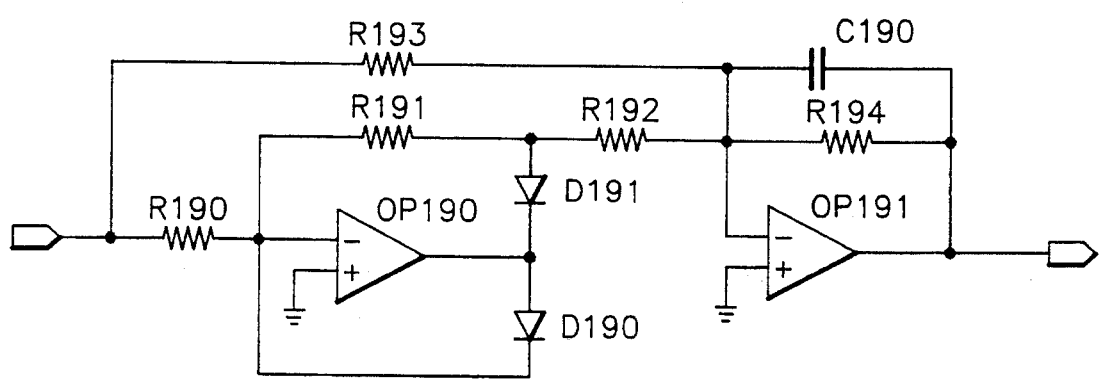
FIG. 13 is a schematic of a fullwave rectifier circuit suitable for use in the context of the present invention.

Similarly, to eliminate electrolysis phenomena, when the pickup resistor Ca is plunged in an electrically conductive liquid, it would be possible to feed the sensor Ca with an alternating current or voltage instead of with a direct current or voltage, providing a rectifier is interposed between the output of the sensor fed with AC and the input to filter means of the present invention. For example, accompanying FIG. 13 shows an embodiment of a fullwave rectifier circuit that could be interposed for this purpose between the output of an AC fed sensor Ca and the digital filter means 100 of the present invention. The fullwave rectifier circuit of FIG. 13 is given purely by way of non-limiting example.

This rectifier circuit comprises two stages each having a respective amplifier OP190 and OP191. The non-inverting inputs of the amplifiers OP190 and OP191 are connected to ground.

The inverting input of the first stage operational amplifier OP190 is connected to the input of the circuit via a resistor R190.

The same inverting input of the operational amplifier OP190 is connected to the output of the amplifier via a loop including a diode D190 having its cathode adjacent to the inverting input.

The inverting input of operational amplifier OP190 is also connected to the output of the amplifier via a loop that includes a series connection of a resistor R190 and a diode D190 whose cathode is connected to the output of OP190.

The common point between the resistor R191 and the diode D191 is connected to the inverting input of OP191 via a resistor R192. The same inverting input of OP191 is connected to the input of the circuit as a whole via a resistor R193. Finally, the inverting input of OP191 is connected to the output of OP191 via a loop comprising a parallel connection of a resistor R194 and a capacitor C190. The output of the rectifier circuit is taken from the output of OP191.

Figure 14:
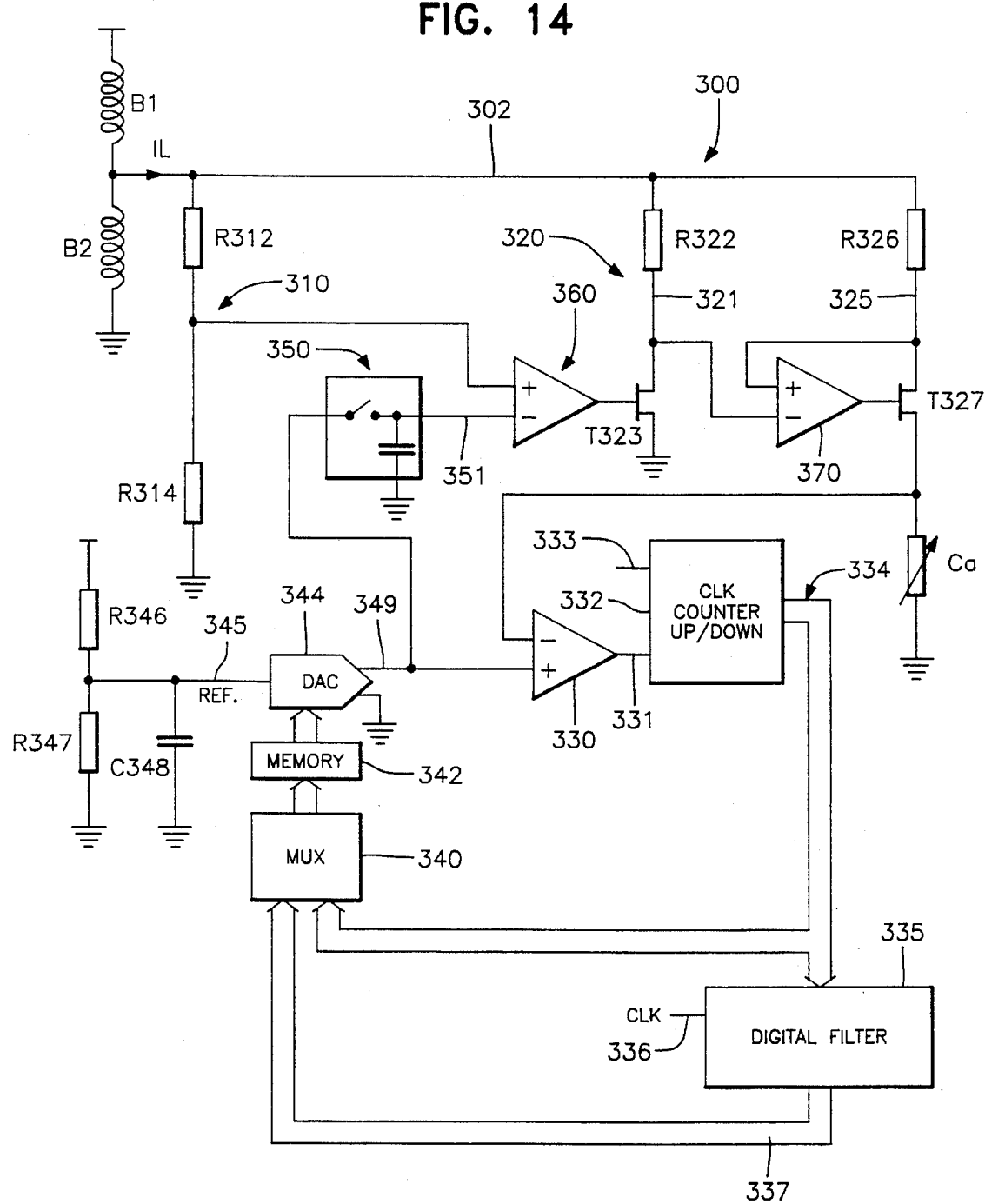
FIG. 14 shows a variant embodiment of a circuit of the present invention.

The variant embodiment of the circuit shown in FIG. 14 is now described.

FIG. 14 shows a resistive sensor Ca and a load of the ratio meter type comprising two coils B1 and B2 connected in series between a positive power supply terminal and ground. FIG. 14 also shows means 310 designed to measure the voltage across the terminals of the load B1–B2 and an output stage 320 of the current source type driven to feed current IL that is proportional to the ratio between the voltage measured across the terminals of the load B2 and the resistance of the sensor Ca. More precisely, in the embodiment shown in FIG. 14, the output stage 320 comprises two branches 321 and 325 connected in parallel between the output 302 of the circuit 300 and ground.

The first branch 321 comprises a resistor R322 connected in series with a transistor T323 between the output 302 and ground.

The second branch 325 comprises a resistor R326 connected in series with a transistor T327 and the sensor Ca between the same output 302 and ground.

The resistors R322 and R326 are preferably of equal resistance, or at least they have resistances in a ratio that is known accurately.

As explained below, the control means of the output stage 320 include a digital filter 335.

The voltage taken from the terminals of the sensor Ca is applied to a first input of a comparator 330. This comparator is equivalent to above-mentioned comparator 110. The output 331 of the comparator 330 is applied to an up/down control input of a counter 332. This counter is equivalent to above-mentioned counter 120. It also receives a control signal at constant frequency on a clock input 333. The output 334 of the counter 332 delivers a digital signal representative of the voltage across the terminals of the sensor Ca. This output 334 of the counter 332 is applied firstly to the input of the digital filter 335, and secondly to the input of a multiplexer 340.

The digital filter 335 may be implemented in numerous different ways. One example is described below with reference to FIG. 15. The digital filter 335 is driven by a clock signal applied to its input 336.

The output 337 of the digital filter 335 is also applied to the multiplexer 340.

The output of the multiplier 340 is connected to the input of a memory unit 342, e.g. comprising D-type bistables. The output of the unit 342 is connected to the input of a digital-to-analog converter 344. This converter receives a reference signal on an input 345. The reference signal is provided by a filtered divider bridge. The filtered divider bridge comprises two resistors R346 and R347 connected in series between the positive power supply terminal and ground. The reference signal taken from the common point between the two resistors R346 and R347 is filtered by a capacitor C348 connected in parallel with the resistor R347.

The filtered digital signal available at the output 349 of the converter 344 is applied to the second input of the comparator 330. In addition, the output 349 of the converter 344 is connected to the input of a sample-and-hold circuit 350. The output 351 of the circuit 350 is connected to the first input of an operational amplifier 360.

The means 310 for measuring the voltage across the terminals of the load, and more precisely the voltage across the terminals of the coil B2, comprise a divider bridge constituted by two resistors R312 and R314 connected in series between the output 302 of the circuit 300 (which output 302 is for connection to the common point between the coils B1 and B2) and ground.

The voltage taken from the common point between the two resistors R312 and R314, representative of the voltage across the terminals of the coil B2, is applied to the second input of the operational amplifier 360.

The impedances of the resistors R312 and R314 used for measuring the voltage across the terminals of the load must be much greater than the impedances of the resistors R322 and R326 to ensure that the current flowing through the divider bridge R312, R314 is negligible.

The output of the operational amplifier 360 drives the grid of the transistor T323.

Thus, this operational amplifier 360 controls the transistor 323 and consequently the current flowing through the branch 321 such that the voltage at the output of the sample-and-hold circuit 350 tends towards the reference voltage measured at the intermediate point of the divider bridge R312–R314.

The voltage present at the common point between transistor T323 and transistor R322 is applied to the first input of an operational amplifier 370. On its second input, the operational amplifier 370 receives the potential present at the common point between the transistor T327 and the resistor R326. Finally, the output of the comparator 370 drives the grid of the transistor T327.

In this way, the operational amplifier 372 copies onto the branch 325 a current that is proportional to the current in the branch 321 with a ratio equal to the ratio between the resistors R322 and R326.

It will be understood that the filter 335 associated with the sample-and-hold circuit 350 enables the transistors T323 and T327 that form a current source to be driven by means of a filter signal that corresponds to the level measured by the sensor Ca.

More precisely, if the current delivered by the output 302 of the circuit 300 is written IL, the voltage measured across the terminals of the coil B2 is written VL, the resistance of the sensor Ca is written Rj, and the voltage measured across the terminals of the sensor Ca is written Vj, then the current flowing through the branch 325 is K.IL and the current flowing through the branch 321 is (1-K).IL such that:

$$Vj=K.IL.Rj$$

Vfilt=$\alpha$VL (where Vfilt is the voltage at the output 351 of the circuit 350, i.e. the filtered voltage V j after stabilization), and consequently:

$$IL=(\alpha.VL)/(K.Rj)$$

It will thus be understood that the output stage 320 of the circuit 300 formed by the combination of the two branches 321 and 325 delivers a current IL that is proportional to the ratio between the voltage VL measured across the terminals of the load and the output resistance Rj of the sensor Ca.

The function of the multiplexer 340 is to apply to the input of the converter 344 either the signal from the output 334 of the up/down counter 332, or else the signal coming from the filter 335. More precisely, at the up/down count instants of the counter 332, the multiplexer 340 applies the output of the up/down counter 332 to the input of the converter 344. When this happens, the sample-and-hold circuit 350 serves to maintain the filtered voltage from the filter 335 on the input of the operational amplifier 360.

At times other than the up/down count instants of the counter 332, the multiplexer 340 can apply the output signal from the filter 335 to the input of the converter 344.

By using a single converter 344, it is possible to achieve automatic compensation for any defects that it might have, e.g. non-linearity or drift.

Figure 15:
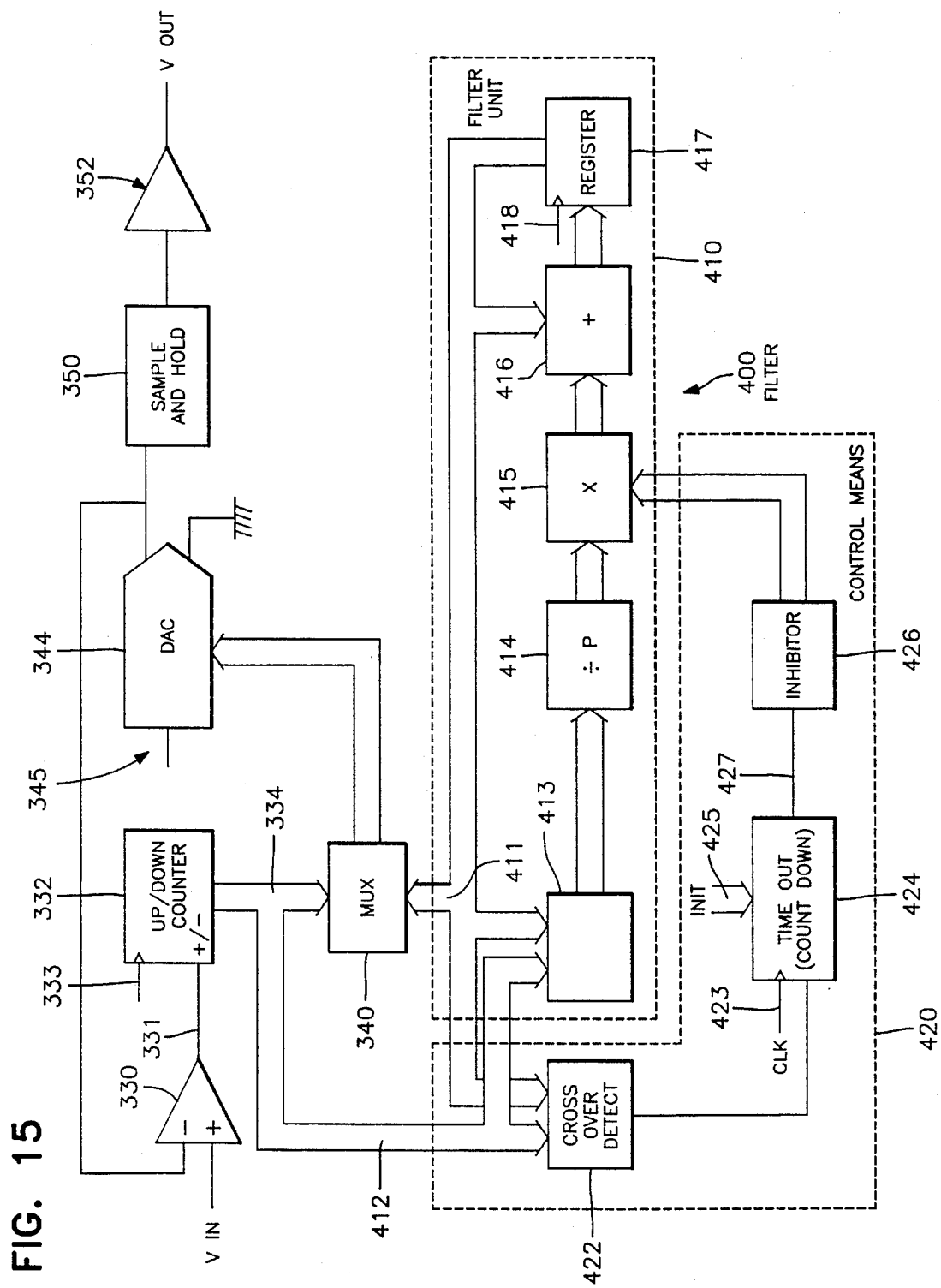
FIG. 15 shows a preferred embodiment of a filter in accordance with the present invention.
Figure 16:
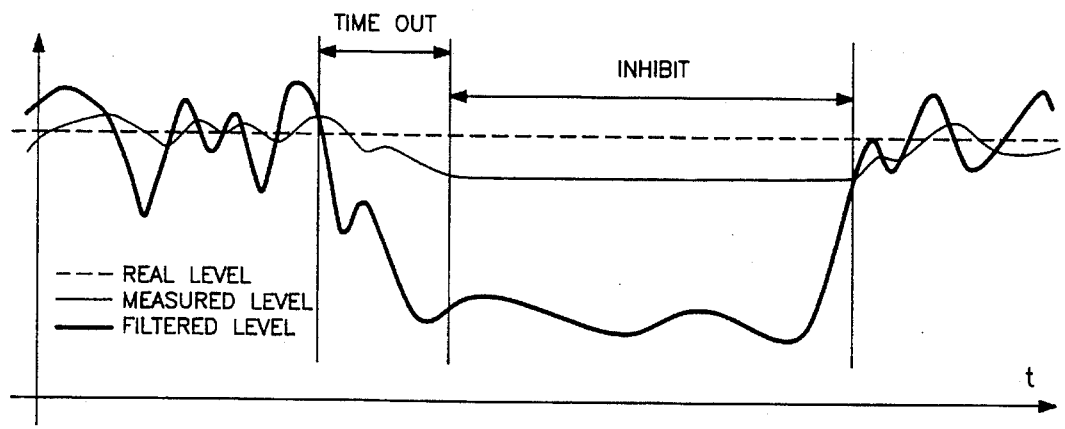
FIG. 16 is a graph showing the real level of liquid in a tank, the input signal applied to the filter by a sensor, and the filtered level at the output from the filter.

The structure of the filter 400 as shown in FIG. 15 is now described with reference to FIG. 16.

The filter 40C shown in FIG. 15 may replace the digital filter shown in FIGS. 3, 4, 11, and 12, or it may be used in addition thereto.

In a variant, the filter 400 shown in FIG. 15 may be used to replace the digital filter 335 outlined in FIG. 14.

To this end, the filter 400 is associated with a comparator 330, a counter 332, a multiplexer 340, a digital-to-analog converter 344, and a sample-and-hold circuit 350, comparable to those of FIG. 14.

On a first input, the comparator 330 receives the analog input signal Vin. On its second input, the comparator 330 receives the analog output signal available from the digital-to-analog converter 344. The output 331 of the comparator 330 is connected to the up/down input of the counter 332. This counter also receives a clock signal at constant frequency on its input 333.

The digital output 334 of the counter 332 is connected to a first input of the multiplexer 340. As explained below, the digital output 334 of the counter 332 is also connected to the input of the filter 400. The output of the multiplexer 340 is connected to the input of the digital-to-analog converter 344, which receives a reference signal on its input 345. In addition to being connected to the second input of the comparator 330, the output of the converter 344 is connected to the input of the sample-and-hold circuit 350. Where appropriate, the output thereof may be connected to the input of an amplifier 352. The filtered analog signal is thus available at the output of the amplifier 352 and is referenced Vout in FIG. 15.

On its input 412, the filter 400 receives the digital input signal from the output 334 of the counter 332, and on its output 411 connected to the second input of the multiplexer 340 it delivers a corresponding filtered signal.

The filter 400 may naturally be implemented in numerous different ways.

In the application to measuring the level of a liquid in a motor vehicle tank, e.g. a fuel tank, a first order filter 400 suffices correctly to eliminate the periodic variations in the input signal that are related to conventional vehicle motion (typically in the range 0.3 Hz to 1 Hz).

However, under exceptional driving conditions, e.g. when turning, or when going uphill or downhill for a long period of time, the apparent liquid level as measured by the sensor Ca can vary significantly and erroneously over a period of several tens of seconds.

The object of the filter 400 shown in FIG. 15 is to reject erroneous values measured in this way.

For this purpose, and as mentioned above, the filter 400 comprises a filter unit 410 associated with control means 420, which comprise:

detection means 422 suitable for detecting crossovers between the signal applied to the input 412 and a filtered value of said input signal as obtained on the output 411;

timing means 424 that are restarted on each crossover detected by the detection means 422; and inhibit means 426 for inhibiting the filter 410 if no crossover is detected by the detection means 422 before the timing means timeout, and for enabling said filter 410 on the first crossover that is detected by the detection means 422 after the filter 410 has been inhibited.

As mentioned above, the filter unit 410 can be implemented in numerous different ways.

In the particular embodiment shown in FIG. 15, the filter unit 410 is constituted by a first order filter that performs the following filter function:

$$filter_n = filter_{n-1} + Mniv \times (NIV_n - filter_{n-1})/P$$

in which:

$filter_n$ represents the filtered signal available at instant n on the output 411 of the filter unit 410;

$filter_{n-1}$ represents the same signal and available at instant n-1 on the output 411 of the filter unit 410;

Mniv represents a multiplication factor;

$NIV_n$ represents the signal applied to the input 412 of the filter unit 410, i.e. the measured signal as available at the output 344 of the counter 332; and P represents a time constant, e.g. $P=2^{14}\tau$, $\tau$ being the clock period of the filter.

More precisely, the filter unit 410 shown in FIG. 15 comprises:

a subtracter 413 that calculates $NIV_n - filter_{n-1}$ by subtracting the value of the signal available at the output of a register 417 from the signal available at the output 334 of the counter 332, the output of the register 417 also constituting the output 411 of the filter unit 410 as applied to the multiplexer 340;

a divider 414 that divides the output signal from the subtracter 413 by the time constant P;

a multiplier 415 that multiplies the output signal from the divider 414 by the multiplicative factor Mniv;

an adder 416 that adds the value $filter_{n-1}$ taken from the output of the register 417 to the signal delivered by the multiplier 415; and finally the above-mentioned register 417.

The register is clocked by a clock signal applied to its input 418.

The filtered value $filter_n$ available on the output of the adder 416 thus periodically refreshes the value that is stored in the register 417 and that is applied to the multiplexer 340.

Each time a crossover is detected between the input signal $NIV_n$ available on the output 334 of the comparator 332 and the filtered value of said input signal $filter_{n-1}$ as available on the output of the register 417, the output of the detection means 422 restarts the timing means 424. For this purpose, the timing means 424 are preferably constituted by a down counter which is loaded with a predetermined value representative of the desired timeout, which value is applied to its input 425 each time a crossover is detected by the detection means 422. The contents of the counter 424 is then decremented at the rate of a clock signal applied to its input 423.

The timeout defined in this way by the counter 424 may have a value of 1 second to 2 seconds, for example.

When the output 427 of the counter 426 reaches zero, i.e. when no crossover has been detected while it was timing out, the inhibit means 426 act on the filter means 410 in order to inhibit them.

In contrast, if a crossover occurs before the end of the timeout, then the timer is restarted.

In addition, the filter 410 is enabled whenever a crossover is again detected by the means 422. This operation is illustrated in FIG. 16.

The inhibit means 426 may act on the filter 410 so as to lock it, i.e. to maintain the output of the filter 410 at the value it had at the moment it was inhibited, i.e. at the end of the timeout.

However, according to a first additional and preferred characteristic of the invention, the inhibit means 426 are adapted not to lock the filter 410 but to change the time constant thereof, by lengthening said time constant, e.g. by a factor of 16.

More particularly, and preferably, when a crossover has not been detected by the means 422 during the timeout period as generated by the counter 424, the inhibit means 426 act on the multiplier 415 so as to lengthen the filter time constant.

The filtered value obtained at the output of the register 417 then changes very slowly but does not stop changing altogether.

To do this, the means 426 may apply a multiplicative coefficient Mniv=1 while the filter 410 is inhibited. Filtering returns to normal the first time the means 422 detect a crossover after inhibition has begun. The means 426 then reapply a multiplicative coefficient Mniv to the multiplier 415 that is compatible with a shorter time constant.

By way of non-limiting example, the multiplicative coefficient Mniv applied by the means 426 to the multiplier 415 may lie in the range 16 to 32 (outside periods of inhibition), and it is defined on the basis of a relationship that is described below.

By way of non-limiting example, the time constant of the filter 410 in normal mode may be about 30 seconds, whereas in inhibited mode it may be about 8 minutes.

The person skilled in the art will readily understand that it is advantageous to increase the time constant of the filter considerably during the "inhibited" period, instead of locking the filter completely. By lengthening the time constant, it is always possible to return to the real value of the input signal, even in the event of a temporary error. For example, in the event of the system being wrongly initialized, e.g. due to a hill start, the initially measured value is wrong. If the filter 410 is completely inhibited on the first crossover, there is a danger of never returning to the real value once the vehicle has returned to a level position. In contrast, slowing the filter 410 down by increasing its time constant means that this difficulty is completely overcome.

According to a second additional advantageous characteristic of the invention, it is proposed that on starting, i.e. when power is applied to the circuit, an intermediate mode should be imposed in which the inhibition (increase of time constant) applied to the filter means 410 is forbidden until a predetermined number of crossovers have been detected by the means 422. For this purpose, the inhibit means 426 are prevented from operating until said number of crossovers has been reached.

This disposition makes it possible to avoid the system being initialized to an erroneous value transmitted by the sensor Ca, e.g. because the vehicle was parked in a sloping position (e.g. half on the curb of a foot path).

Under such circumstances, the fuel level changes suddenly when the vehicle begins to move. Consequently, if it were put immediately into normal mode, the system would detect a large apparent, but erroneous, variation in level. No crossover would be detected during the timeout. The system would then switch to inhibited mode. In the absence of the intermediate mode which is preferably applied in the context of the invention, the system would take a very long time to get to the proper value.

It should be observed that so far as the circuit is concerned, when the detection means 422 detect permanent equality between the measured value from the counter 332 and the filtered value from the register 417, that is considered as constituting a single crossover.

According to a third advantageous additional characteristic of the invention, the circuit shown in FIG. 15 includes a non-linear element. This non-linear element is adapted to compensate for the non-linearity of the combination of sensor Ca and load B1–B2.

Most combinations of liquid level sensor Ca and ratio meter are not linear.

If the filtering is linear, then the response of the system varies as a function of the measured value.

Two means for compensating such non-linearity may be envisaged.

The first means consist in using a non-linear analog-to-digital converter 344 in order to obtain a number that is constant in terms of steps per degree, whereas a linear converter would give a number that is constant in terms of steps per ohm. The response curve of the converter 344 should then be as close as possible to the inverse of the curve representative of the sensor Ca associated with the meter B1–B2.

The second compensation means consist in causing the time constant of the filter 410 to vary as a function of the response of the combination of sensor Ca and meter B1–B2. More precisely, this type of correction can be implemented by means of a multiplication operator in the filtering performed by the means 410.

This can be done, for example, by providing a multiplicative factor Mniv of the form:

$$Mniv = 16(2 - (NIV_{max} - NIV_n)/NIV_{max})$$

in which $NIV_{max}$ represents the maximum amplitude of the signal available at the output 334 of the counter 332.

Figure 17:
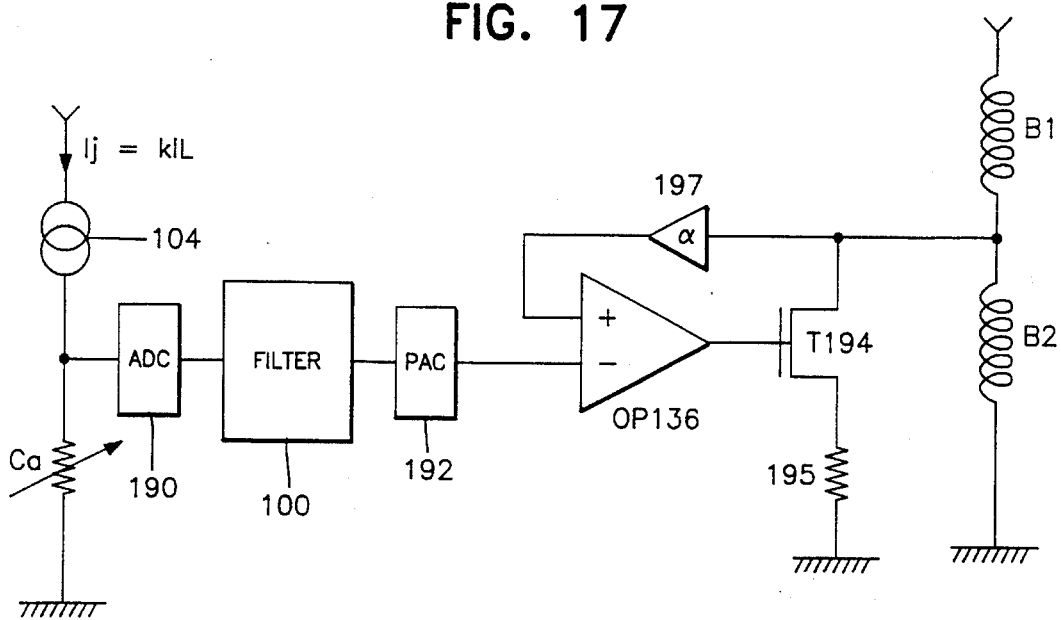
FIG. 17 shows a variant embodiment of the device of the present invention.

The variant embodiment shown in FIG. 17 is now described.

This figure shows the sensor Ca of internal resistance Rj and a meter, e.g. a ratio meter B1–B2.

The sensor Ca is fed by a current generator 104.

The analog voltage Vj taken from the terminals of the sensor Ca is applied to the input of an analog-to-digital converter 190. The output thereof is applied to the input of the digital filter 100. This filter may be implemented in any of the ways described above. The output from the digital filter 100 is connected to the input of a digital-to-analog converter 192.

The output stage of the circuit comprises a current generator constituted by a transistor T194 in series with a shunt resistor 195.

The output of the converter 192 is connected to the first input of an operational amplifier OP196. On its second input, this amplifier receives the output voltage of the circuit, i.e. the voltage across the terminals of the meter B1–B2, via an attenuator 197 of ratio $\alpha$.

In addition, the current source 104 is controlled by a circuit responsive to the output current IL of the circuit, i.e. the current flowing through the shunt resistor 195, such that the source 104 delivers a current Ij=K.IL.

In a manner comparable to the circuit of FIG. 14, the following applies:

$$Vj=K.IL.Rj$$

after stabilization, the output voltage from the converter 192=Vj, thus Vj=$\alpha$VL and consequently:

$$IL=(\alpha.VL)/(K.Rj)$$

Here again, the circuit delivers an output current IL to the load that is proportional to the ratio between the voltage VL measured across the terminals of the load and the output resistance Rj of the sensor Ca.

What is claimed is:

1. A circuit for processing the output signal from a resistive analog sensor, comprising firstly digital filter means, and secondly a module forming a digital-to-impedance converter, which means and module are interposed in series between the output of the sensor and the input of an associated load, said digital-to-impedance converter presenting an output impedance that is variable as a function of the output signal from the digital filter means, which output impedance is equivalent to the output resistance of the sensor.

2. A circuit according to claim 1, wherein the digital-to-impedance converter comprises means for measuring the voltage at the terminals of the load and an output stage of the controlled current source type for delivering a current that is proportional to the ratio between the voltage measured at the terminals of the load and the output resistance of the sensor.

3. A circuit according to claim 2, wherein the control means of the current source comprise a variable gain amplifier connected to one input of a comparator whose other input is connected to the input of the load and whose output is connected to the current source.

4. A circuit according to claim 3, wherein the variable gain amplifier comprises an attenuator constituted by a resistor array driven by the output of the digital filter means.

5. A circuit according to claim 4, wherein the variable gain amplifier comprises a first amplifier stage, the attenuator constituted by the resistor array, and a second amplifier stage.

6. A circuit according to claim 4, wherein the resistor array comprises a divider bridge having a plurality of resistors of resistance R connected in series via a resistor of resistance 2R between ground and the output of the array, each common point between two adjacent resistors of said divider bridge, and the output point thereof also being connected via respective resistors of resistance 2R to respective switches, each switch being respectively controlled by one of the outputs of the digital filter means in such a manner that each switch connects the corresponding resistor either to ground, or to a reference voltage.

7. A circuit according to claim 4, wherein the resistor array comprises a divider bridge comprising a plurality of resistors of resistance R connected in series via a resistor of resistance 2R between ground and a reference voltage, each point common to two adjacent resistors in said divider bridge and its end point receiving the reference voltage also being connected via a respective resistor of resistance 2R to a respective switch, the switches being driven by respective associated outputs of the digital filter means in such a manner that each switch connects the corresponding resistor either to ground or to the input of an amplifier stage.

8. A circuit according to claim 2, wherein the means for measuring the voltage at the terminals of the load include a resistive divider bridge.

9. A circuit according to claim 2, wherein the current source type output stage comprises a transistor connected in series with the sensor.

10. A circuit according to claim 2, wherein the current source type output stage comprises two parallel-connected branches each including a transistor.

11. A circuit according to claim 10, wherein a first branch comprises a resistor connected in series with a transistor, and the second branch comprises a resistor connected in series with a transistor and with the sensor.

12. A circuit according to claim 10, wherein one of the transistors is driven by an operational amplifier that receives on respective inputs both the voltage signal as measured at the terminals of the load and the output signal from the filter.

13. A circuit according to claim 12, wherein one of the transistors is driven by an operational amplifier that receives on respective inputs the potentials present at respective intermediate points of the two branches.

14. A circuit according to claim 10, wherein one of the transistors is driven by an operational amplifier that receives on respective inputs both the voltage signal as measured at the terminals of the load and the output signal from the filter, wherein the digital filter means comprise a comparator stage having a first input receiving the output signal from the sensor, an up/down counter having an input that receives a clock signal at constant frequency, and having an up/down control input that receives the output from the comparator stage, a digital filter whose input is connected to the output of the up/down counter, and an analog-to-digital converter connected between the output of the digital filter and a second input of the comparator, and wherein a sample-and-hold circuit is interposed between the output of the analog-to-digital converter and one of the inputs of the operational amplifier.

15. A circuit according to claim 1, wherein the digital-to-impedance converter is constituted by a resistor array and by an impedance converter.

16. A circuit according to claim 15, wherein the impedance converter comprises a unit comprising in series a current generator and a resistor connected to the input terminal of the load, and means for controlling the current generator.

17. A circuit according to claim 16, wherein the means for controlling the current generator comprise a resistor array driven by the digital filter means.

18. A circuit according to claim 16, wherein the means for controlling the current generator are responsive to the voltage present at the input terminals of the load.

19. A circuit according to claim 15, wherein the impedance converter comprises a shunt resistor connected in series with the output of the resistor array, a first voltage-copying stage suitable for copying the voltage that is present at the input of the load onto the output terminals of the resistor array, a current generator connected in series with a resistor forming a unit connected to the input terminals of the load, and a second voltage-copying stage suitable for copying the voltage present at the terminals of the shunt resistor onto the resistor that is connected in series with the current source.

20. A circuit according to claim 19, wherein the resistor connected in series with the current generator is of smaller resistance than the shunt resistor, typically being equal to one-thousandth of the resistance of the shunt.

21. A circuit according to claim 19, wherein the resistor array comprises a set of switches connected in series, driven by respective different bits of the output signal of the digital filter means and connected in parallel with respective associated resistors.

22. A circuit according to claim 21, wherein the resistors are of resistances that increase progressively in application of the relationship $2^n R$ in which n is a positive integer.

23. A circuit according to claim 15, wherein the resistor array is driven by the more significant output bits from the digital filter means.

24. A circuit according to claim 1, wherein the digital-to-impedance converter comprises a digital-to-analog converter and an analog to impedance converter.

25. A circuit according to claim 1, wherein the control means for the current source comprise digital calculation means.

26. A circuit according to claim 25, wherein the digital calculation means have one input connected to the input of the load via an analog-to-digital converter and their output connected to the control input of the current source via a digital-to-analog converter.

27. A circuit according to claim 1, wherein the control means of the current source comprise analog calculation means.

28. A circuit according to claim 27, wherein the control means receives analog data representative of the output resistance of a resistor array under the control of the digital filter means.

29. A circuit according to claim 1, wherein the digital filter means comprise a comparator stage having a first input receiving the output signal from the sensor, an up/down counter having an input that receives a clock signal at a constant frequency, and having an up/down control input that receives the output from the comparator stage, and a resistor array connected between the output of the up/down counter and a second input of the comparator stage.

30. A circuit according to claim 29, wherein the resistor array comprises a divider bridge having a plurality of resistors of resistance R connected in series via a resistor of resistance 2R between ground and the output of the array, each common point between two adjacent resistors of said divider bridge, and the output point thereof also being connected via respective resistors of resistance 2R to respective switches, each switch being respectively controlled by one of the outputs of the digital filter means in such a manner that each switch connects the corresponding resistor either to ground, or to a reference voltage.

31. A circuit according to claim 29, wherein the resistor array comprises a divider bridge comprising a plurality of resistors of resistance R connected in series via a resistor of resistance 2R between ground and a reference voltage, each point common to two adjacent resistors in said divider bridge and its end point receiving the reference voltage also being connected via a respective resistor of resistance 2R to a respective switch, the switches being driven by respective associated outputs of the digital filter means in such a manner that each switch connects the corresponding resistor either to ground or to the input of an amplifier stage.

32. A circuit according to claim 29, including means suitable for modifying the frequency of the clock signal when switched on.

33. A circuit according to claim 32, wherein the means generating the clock signal comprise an oscillator and a divider connected in cascade, and wherein the means for modifying the frequency of the clock signal comprise means suitable for inhibiting the divider at switch on.

34. A circuit according to claim 33, wherein the inhibition means are connected to the output of the comparator stage to interrupt inhibition of the divider after a predetermined number of zero crossings have been detected in the output of the comparator stage.

35. A circuit according to claim 1, wherein the digital filter means comprise a series connection of an analog-to-digital converter and a digital filter.

36. A circuit according to claim 1, wherein the digital filter means comprise a comparator stage having a first input receiving the output signal from the sensor, an up/down counter having an input that receives a clock signal at constant frequency, and having an up/down control input that receives the output from the comparator stage, a digital filter whose input is connected to the output of the up/down counter, and an analog-to-digital converter connected between the output of the digital filter and a second input of the comparator.

37. A circuit according to claim 1, wherein the filter means comprise control means including:

detection means suitable for detecting crossovers between the input signal and a filtered value of said input signal;

timing means restarted on each crossover detected by the detection means; and inhibit means for inhibiting the filter if no crossover is detected by the detection means before the timing means have timed out, and for enabling the filter on the first crossover that is detected by the detection means after the filter has been inhibited.

38. A circuit according to claim 37, wherein the digital filter means comprises a first order filter.

39. A circuit according to claim 37, wherein the digital filter means is of the form:

$$\text{filter}_n = \text{filter}_{n-1} + [\text{Mniv}/P] \text{Mniv} \times (\text{NIV}_n - \text{filter}_{n-1})/P$$

where:

filter$_n$ designates the value of the filter signal at instant n;

filter$_{n-1}$ designates the value of the filter signal at instant n−1;

Mniv designates a multiplicative factor;

NIV$_n$ designates the input value measured at instant n;

P designates a time constant; and n is a positive integer.

40. A circuit according to claim 37, wherein the time out of the timing means is of the order of 1 second to 2 seconds.

41. A circuit according to claim 37, wherein the inhibit means comprise means suitable for changing the time constant of the filter.

42. A circuit according to claim 41, wherein the means suitable for modifying the time constant of the filter are adapted to modify a multiplicative factor of the filter function so as to increase the filter time constant during the inhibit period.

43. A circuit according to claim 37, wherein the filter means comprise means suitable for preventing the inhibit means from operating when the circuit is switched on until the detection means have detected a predetermined number of crossovers between the input signal and the filtered value of said input signal.

44. A circuit according to claim 37, including non-linear means suitable for compensating the non-linearity of the combination of sensor and the load.

45. A circuit according to claim 44, including an analog-to-digital converter that is non-linear.

46. A circuit according to claim 44, including means suitable for modifying the time constant of the filter as a function of the non-linear response of the combination comprising the sensor and the load.

47. A circuit according to claim 46, wherein the means for modifying the time constant of the filter act on a multiplicative factor in the filter function.

48. A circuit according to claim 47, wherein the multiplicative factor Mniv in the filter function is of the form:

$$[M_{niv}=16(2-NIV_{max})]16(2NIV_{max}-NIV_n/NIV_{max})$$

wherein $NIV_{max}$ represents the maximum amplitude of the signal available at the input of the filter.

49. A circuit according to claim 1, wherein the digital filter means and the module constituting the digital-to-impedance converter are implemented in the form of a single integrated circuit.

50. A circuit according to claim 1, wherein said circuit is located in the sensor.

51. A circuit according to claim 1, wherein said circuit is located in the load.

52. A circuit according to claim 1, wherein the sensor is a resistive sensor, in particular for measuring the level of a liquid.

53. A circuit according to claim 1, wherein the sensor is a potentiometer type sensor, fed with a regulated voltage from which output data is taken by means of the wiper of the potentiometer.

54. A circuit according to claim 1, wherein the sensor is of the rheostat type, fed by a current source, and from which output data is taken from the terminals of the variable resistance constituted in this way.

55. A circuit according to claim 1, wherein the current flowing through the sensor is less than the current flowing through the load.

56. A circuit according to claim 1, wherein the sensor is fed with alternating current and a rectifier circuit is provided between the output from the sensor and the input to the digital filter means.

57. A circuit according to claim 1, wherein the load is constituted by a meter, preferably by a ratio meter.

58. A circuit according to claim 1, further comprising:
   a comparator having a first input on which it receives the voltage at the terminals of the sensor;
   an up/down counter having an up/down control input connected to the output of the comparator;
   a digital filter whose input is connected to the output of the up/down counter;
   a multiplexer whose inputs are connected respectively to the output of the up/down counter and to the output of the digital filter;
   a digital-to-analog converter whose input is connected to the output of the multiplexer and whose output is connected to the second input of the up/down counter;
   a sample-and-hold circuit whose input is connected to the output of the digital-to-analog converter; and
   a control circuit that controls a current source at the output of the circuit as a whole on the basis of the voltage measured at the terminals of the load and of the signal from the sample-and-hold circuit.

59. A circuit according to claim 1, further comprising a current source that feeds the sensor, which current source is controlled to deliver a current proportional to the output current supplied to the load.

60. A circuit according to claim 1, further comprising:
   an analog-to-digital converter whose input is connected to the output of the sensor;
   a digital filter whose input is connected to the output of the analog-to-digital converter;
   a digital-to-analog converter whose input is connected to the output of the digital filter;
   an attenuator whose input is connected to the load; and
   an output current source which is driven by the difference between the signal from the digital-to-analog converter and the signal from the attenuator.

* * * * *